(12) United States Patent
Southwood et al.

(10) Patent No.: US 8,582,117 B2
(45) Date of Patent: Nov. 12, 2013

(54) SYSTEMS AND METHODS FOR CALIBRATING AN OPTICAL NON-CONTACT SURFACE ROUGHNESS MEASUREMENT DEVICE

(75) Inventors: Mark Southwood, Vancouver, WA (US); Wayne Case, Portland, OR (US)

(73) Assignee: Schmitt Industries, Inc., Portland, OR (US)

( * ) Notice: Subject to any disclaimer, the term of this patent is extended or adjusted under 35 U.S.C. 154(b) by 237 days.

(21) Appl. No.: 13/083,130

(22) Filed: Apr. 8, 2011

(65) Prior Publication Data
US 2012/0257217 A1    Oct. 11, 2012

(51) Int. Cl.
*G01B 11/30* (2006.01)
(52) U.S. Cl.
USPC .......................................... 356/600; 356/601
(58) Field of Classification Search
USPC ................................................. 356/600–613
See application file for complete search history.

(56) References Cited

U.S. PATENT DOCUMENTS

| | | | |
|---|---|---|---|
| 4,334,780 A | 6/1982 | Pernick | |
| 4,364,663 A | 12/1982 | Gardner et al. | |
| 4,803,374 A | 2/1989 | Monfort et al. | |
| 4,950,905 A | 8/1990 | Butler et al. | |
| 4,973,164 A | 11/1990 | Weber et al. | |
| 4,991,971 A | 2/1991 | Geary et al. | |
| 5,119,132 A | 6/1992 | Butler | |
| 5,162,660 A | 11/1992 | Popil | |
| 5,164,790 A | 11/1992 | McNeil et al. | |
| 5,189,490 A | 2/1993 | Shetty et al. | |
| 5,196,906 A | 3/1993 | Stover et al. | |
| 5,205,900 A | 4/1993 | Inoue et al. | |
| 5,241,369 A | 8/1993 | McNeil et al. | |
| 5,313,542 A | 5/1994 | Castonguay | |
| 5,608,527 A | 3/1997 | Valliant et al. | |
| 5,625,451 A | 4/1997 | Schiff et al. | |
| 5,661,556 A | 8/1997 | Schiff et al. | |
| 6,062,948 A | 5/2000 | Schiff et al. | |
| 6,078,391 A | 6/2000 | Schiff | |
| 6,624,899 B1 | 9/2003 | Clark | |
| 6,700,657 B1 | 3/2004 | Southwood | |
| 6,781,703 B1 | 8/2004 | Southwood | |
| 7,460,216 B2 * | 12/2008 | Lecomte et al. ................. 356/32 |

* cited by examiner

*Primary Examiner* — Tri T Ton
(74) *Attorney, Agent, or Firm* — John R. Thompson; Stoel Rives LLP

(57) ABSTRACT

A calibration apparatus for an optical non-contact surface roughness measurement device allowing for quick, accurate, and repeatable device calibration is described. In certain embodiments, the calibration apparatus may include a base, one or more calibration surfaces coupled to a top surface of the base, and an alignment collar coupled to the top surface of the base defining a window exposing the one or more calibration surfaces. By utilizing the mechanical structure of the alignment collar and base, the optical non-contact surface roughness measurement device may be accurately aligned with respect to the calibration surfaces, allowing for repeatable calibration measurements.

19 Claims, 6 Drawing Sheets

SYSTEMS AND METHODS FOR CALIBRATING AN OPTICAL NON-CONTACT SURFACE ROUGHNESS MEASUREMENT DEVICE

TECHNICAL FIELD

This disclosure relates generally to the measurement of surface roughness and, more particularly, to systems and methods for calibrating an optical non-contact surface roughness measurement device.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Maintaining surface roughness within certain tolerances is an important consideration in the manufacture of many materials and devices. For example, manufacturing sheet metal may require that the surface of the metal have no greater than a certain level of surface roughness based on manufacturing specifications. Devices capable of measuring surfaces roughness are commonly used to verify that materials and devices are manufactured within tolerances and to ensure manufacturing equipment is operating properly.

Devices for measuring surface roughness include mechanical surface contact type stylus profilometers and surface non-contact optical profilometers. These conventional surface roughness measuring devices have several drawbacks, however, including potentially damaging a surface during a measurement, high cost, slow measurement speed, lack of portability, sensitivity to environmental conditions, and lack of a direct way to comparison measured surfaces to known surface roughness standards. More sophisticated surface non-contact optical devices for measuring surface roughness, including devices that measure the distribution of reflected (i.e., specular) light and scattered light from a surface and use the measured distribution to calculate surface roughness, offer advantages over conventional devices. For example, the optical surface roughness measuring device described in U.S. Pat. No. 5,608,527 ("the '527 patent"), which is herein incorporated by reference in its entirety, allows for precise surface roughness measurement but does not damage a measured surface, is fast and portable, and is less sensitive to environmental conditions and damage from normal handling.

Figure 1:
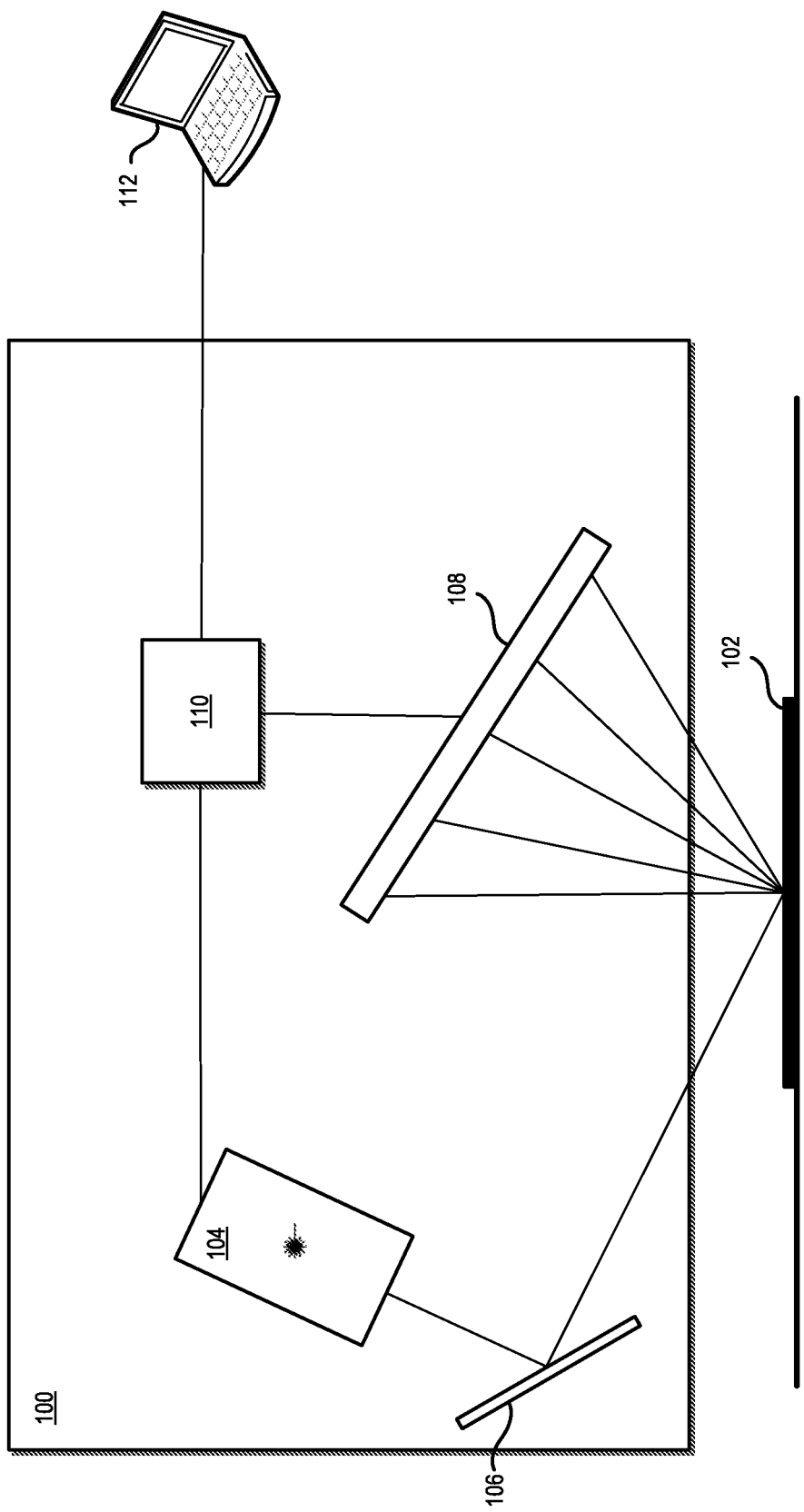
FIG. 1 illustrates a block diagram of an optical non-contact surface roughness measurement device consistent with embodiments disclosed herein.

FIG. 1 illustrates a block diagram of an optical non-contact surface roughness measurement device 100 consistent with embodiments disclosed herein. The illustrated optical non-contact surface roughness measurement device 100 is configured to measure the roughness of a surface 102 based on measuring the relative distribution of reflected light and scattered light from the surface using, for example, techniques described in the '527 patent.

The optical non-contact surface roughness measurement device 100 may include a coherent light source 104 that, in some embodiments, may be a laser having a nominal output wavelength of 650 nm. The output of the coherent light source 104 may be directed towards one or more reflective surfaces 106 configured to re-direct the output to a surface 102 being measured by the device 100. In certain embodiments, the reflective surfaces 106 may include mirrors, prisms, or any other suitable optical components, and may be configured to direct the output of the coherent light source 104 towards the surface 102 at a desired incident angle (e.g., a shallow angle of incidence). In alternative embodiments, the optical non-contact surface roughness measurement device 100 may not include reflective surfaces 106, but rather may integrate the coherent light source 104 in an orientation where its output is directed towards the surface at variable incident angles.

After contacting the surface 102, the output of the coherent light source 104 may be reflected and scattered to one or more arrays of detectors 108. In certain embodiments, the detectors 108 may include one or more photodiode components configured to measure light indecent upon the detectors 108. The detectors 108 may be configured to detect a distribution of reflected light and a distribution of scattered light from the surface 102. Based on the relative distributions of reflected and scattered light incident upon the detectors 108, information relating to the roughness of the surface 102 may be calculated using the techniques described in the '527 patent. In certain embodiments, the calculated information relating to the roughness of the surface 102 may be a roughness parameter characterizing the surface based on the vertical deviations of the roughness profile of the surface from a mean line (e.g., an Ra or RMS roughness factor).

Operation of the optical non-contact surface roughness measurement device 100 may be controlled by internal electronics 110 and/or an external control system 112. In certain embodiments, internal electronics 110 and/or external control system 112 may be configured to communicatively interface with the coherent light source 104, the detectors 108, and any other component of the measurement device 100. In some embodiments, external control system 112 may provide a user interface for a user to provide control information to and receive measurement information from the optical non-contact surface roughness measurement device 100.

Figure 2:
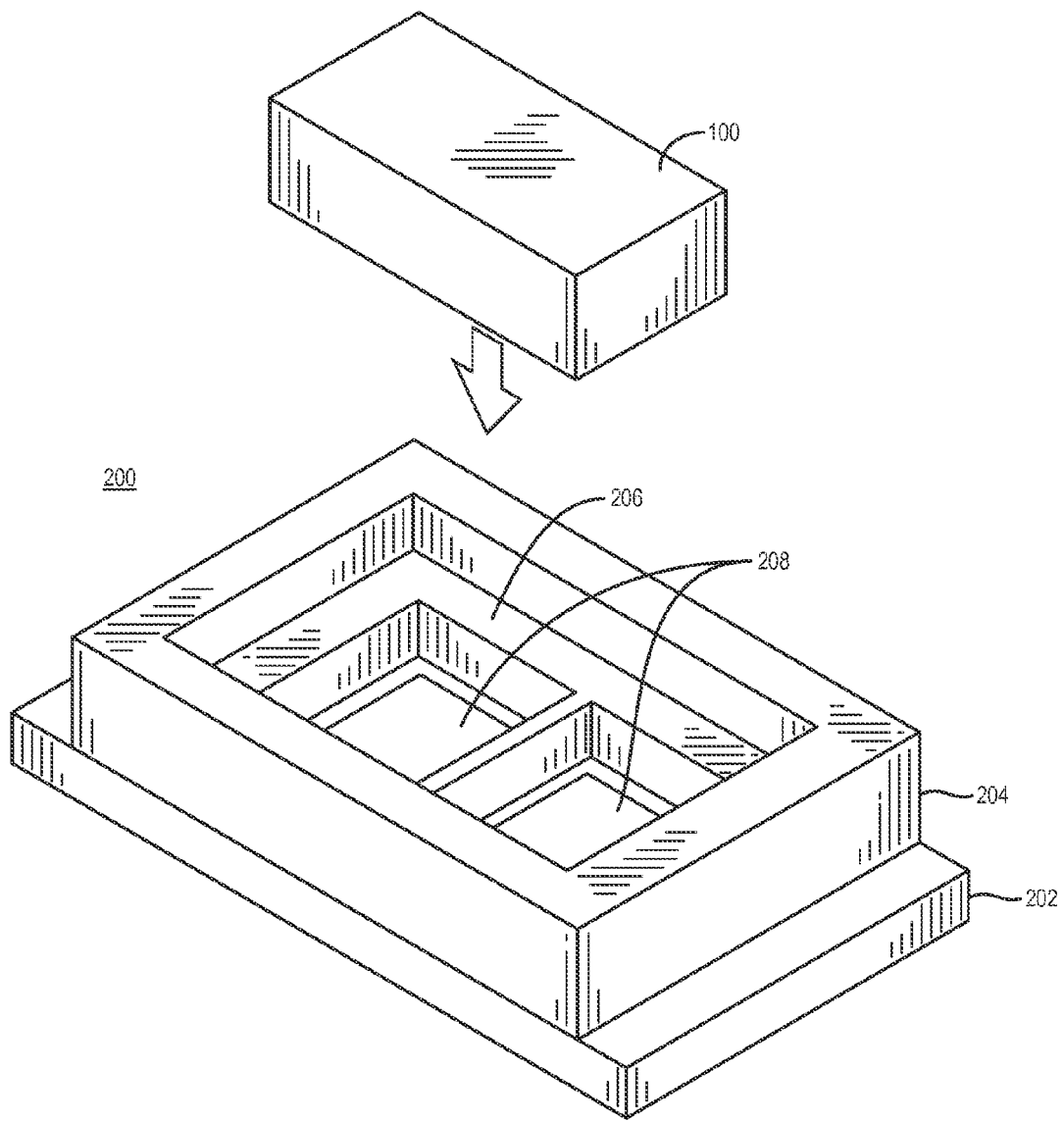
FIG. 2 illustrates a perspective view of a calibration device for an optical non-contact surface roughness measurement device consistent with embodiments disclosed herein.

FIG. 2 illustrates a perspective view of a calibration device 200 for an optical non-contact surface roughness measurement device 100 consistent with embodiments disclosed herein. In certain embodiments, the optical non-contact surface roughness measurement device 100 may require calibration to increase its measurement accuracy and repeatability. Further, an optical non-contact surface roughness measurement device 100 may require verification to ensure it is measuring surfaces accurately. Calibration and verification of the optical non-contact surface roughness measurement device 100 may be achieved by measuring the roughness of one or more calibration surfaces 208 having known roughness factors, and generating calibration equations based on the measured and known roughness factors using techniques described in the '527 patent.

The calibration device 200 may include a base 202 and an alignment collar 204 disposed on a top side of the base 202. The base 202 and the alignment collar 204 may be comprised of any suitable structural rigid material including, for example, various metals, plastics, or polymers. In certain embodiments, the base 202 and the alignment collar 204 may be rigidly coupled using, for example, adhesives, bolts, screws, and/or the like. In alternative embodiments, the base 202 and the alignment collar 204 may be coupled using a mechanism that allows the distance between the base 202 and the alignment collar 204 to be changed. For example, the base 202 and the alignment collar 204 may include a mechanism wherein the base 202 and alignment collar 204 are coupled using adjustable screws having one or more springs (e.g., Bellville springs) disposed between the base 202 and the alignment collar 204. By adjusting the screws, the distance between the base 202 and the alignment collar 204 may be changed (e.g., the alignment collar 204 may be "raised" on the base 202). In certain embodiments, this may assure proper vertical alignment of an optical non-contact surface roughness measurement device 100 with respect to the calibration device 200.

In certain embodiments, one or more calibration surfaces 208 having known surface roughness factors may be mounted on the base 202. In certain embodiments, the known roughness factors of the one or more calibration surfaces 208 may be initially measured and recorded by a highly-precise fixed master optical non-contact contact surface roughness measurement device. In certain embodiments, the calibration surfaces 208 may be mounted on the base via adhesives, epoxies, bolts, screws, and/or the like. The alignment collar 204 may define a window that exposes the one or more calibration surfaces 208 mounted on the base 202. As illustrated, this window may allow the optical non-contact surface roughness measurement device 100 to measure one or more locations of the exposed calibration surfaces 208. In certain embodiments, the one or more locations may be "strips" approximately 1 mm wide and 6-7 mm long. The window defined by the alignment collar 204 may further function in part to vertically and/or horizontally align the optical non-contact surface roughness device 100 with respect to the calibration surfaces 208 in a repeatable manner, as discussed in more detail below.

In some embodiments, the one or more calibration surfaces 208 may be a single calibration surface mounted on the base 202 and centered in the window defined by the alignment collar 204. In other embodiments, as illustrated in FIG. 2, the one or more calibration surfaces 208 may include a plurality of calibration surfaces mounted on the base 202 in a liner configuration within the window defined by the alignment collar 204. In alternative embodiments, the one or more calibrations surfaces 208 may include a plurality of calibration surfaces mounted on the base 202 in a grid configuration within the window defined by the alignment collar 204.

The alignment collar 204 may include a vertical alignment ledge 206 disposed on an inner periphery of the window defined by the alignment collar 204. In certain embodiments, the vertical alignment ledge 206 may define a surface having a relative elevation at a predetermined distance from the elevation of the calibration surfaces 208. This predetermined distance may be at an elevation at which the bottom of the optical non-contact surface roughness measurement device 100 should be with respect to the calibration surfaces 208 to properly measure surface roughness one or more locations on the calibration surfaces 208 using the techniques described in the '527 patent. In certain embodiments, this predetermined distance may ensure that a substantial portion of any light output by the optical non-contact surface roughness measurement device 100 that is reflected and/or scattered off the calibration surfaces 208 is incident upon the one or more arrays of detectors 108 as described in the '527 patent.

The relative elevation of the vertical alignment ledge 206 with respect to the surface of the calibration surfaces 208 may be adjusted using the adjustable mechanism coupling the alignment collar 204 and the base 202. For example, in an adjustable mechanism that includes adjustable screws, by adjusting the screws, the distance between the base 202 and the alignment collar 204, and thus the relative elevation of the vertical alignment ledge 206 with respect to the calibration surfaces 208, may be changed (e.g., the vertical alignment ledge 206 may be "raised" and/or "lowered" with respect to the calibration surfaces 208). In certain embodiments, this may assure proper alignment of an optical non-contact surface roughness measurement device 100 with respect to the calibration device 200.

In certain embodiments, the one or more calibration surfaces 208 may be precision ground surfaces having known surface roughness factors measured by a highly-precise master optical non-contact surface roughness measurement device. Alternatively, the one or more calibration surfaces 208 may be prepared by precision etching, lapping, milling, and the like. In some embodiments, the one or more calibration surfaces 208 may be precision-ground surfaces manufactured in such a manner so that the surfaces have known Ra or RMS roughness factors measured by a highly-precise master optical non-contact surface roughness measurement device. In certain embodiments, the one or more calibration surfaces 208 may comprise surfaces having roughness factors ranging from 0.0025 μm Ra to 3.2 μm Ra. The one or more calibration surfaces 208 may, however comprise surfaces having any roughness factors suitable for calibration of the optical non-contact surface roughness measurement device 100.

To calibrate and/or verify the optical non-contact surface roughness measurement device 100, one or more specific locations on the one or more calibration surfaces 208 may be measured so as to obtain measured roughness factors for the calibration surfaces 208. In certain embodiments, these one or more locations on the one or more calibration surfaces 208 may have known roughness factors obtained from a prior measurement from a highly-precise master optical non-contact surface roughness measurement device. To obtain measured roughness factors for the one or more calibration surfaces 208, the optical non-contact surface roughness measurement device 100 may be lowered into the window defined by the alignment collar 204 as illustrated in FIG. 2. In certain embodiments, a bottom portion of the optical non-contact surface roughness measurement device 100 may be secured against a portion of the vertical alignment ledge 206 within the inner periphery of the alignment collar 204.

In some embodiments, placing a portion of the optical non-contact surface roughness measurement device 100 against a portion of the vertical alignment ledge 206 may secure the optical non-contact surface roughness measurement device 100 at a predefined vertical distance from the one or more calibration surfaces 208. As discussed above, placing the optical non-contact surface roughness measurement device 100 at this predetermined distance above the one or more calibration surfaces 208 may ensure that a substantial portion of any light output by the measurement device 100 that is reflected and/or scattered off one or more specific measurement locations on the one or more calibration surfaces 208 is incident upon the one or more arrays of detectors 108 included in the measurement device 100. In this manner, securing a portion of the measurement device 100 against a vertical alignment ledge 206 may allow for quick, convenient, and repeatable vertical alignment of the measurement device 100 with respect to the calibration surfaces 208.

A matrix including known roughness factors and measured roughness factors for the one or more calibration surfaces 208 measured during calibration may be generated. Calibration equations may then be calculated using the known roughness factors and measured roughness factors through regression analysis techniques. Once calibration equations have been calculated, roughness factors measured by the optical non-contact surface roughness measurement device 100 may be adjusted according to the calibration equations to generate calibrated and more accurate measured roughness factors (e.g., Ra or RMS roughness factors). Further, if measured roughness factors are at or near known roughness factors previously measured by a highly-precise fixed master optical non-contact contact surface roughness measurement device, the optical non-contact surface roughness measurement device 100 may be verified as being calibrated and/or accurate.

Figure 3:
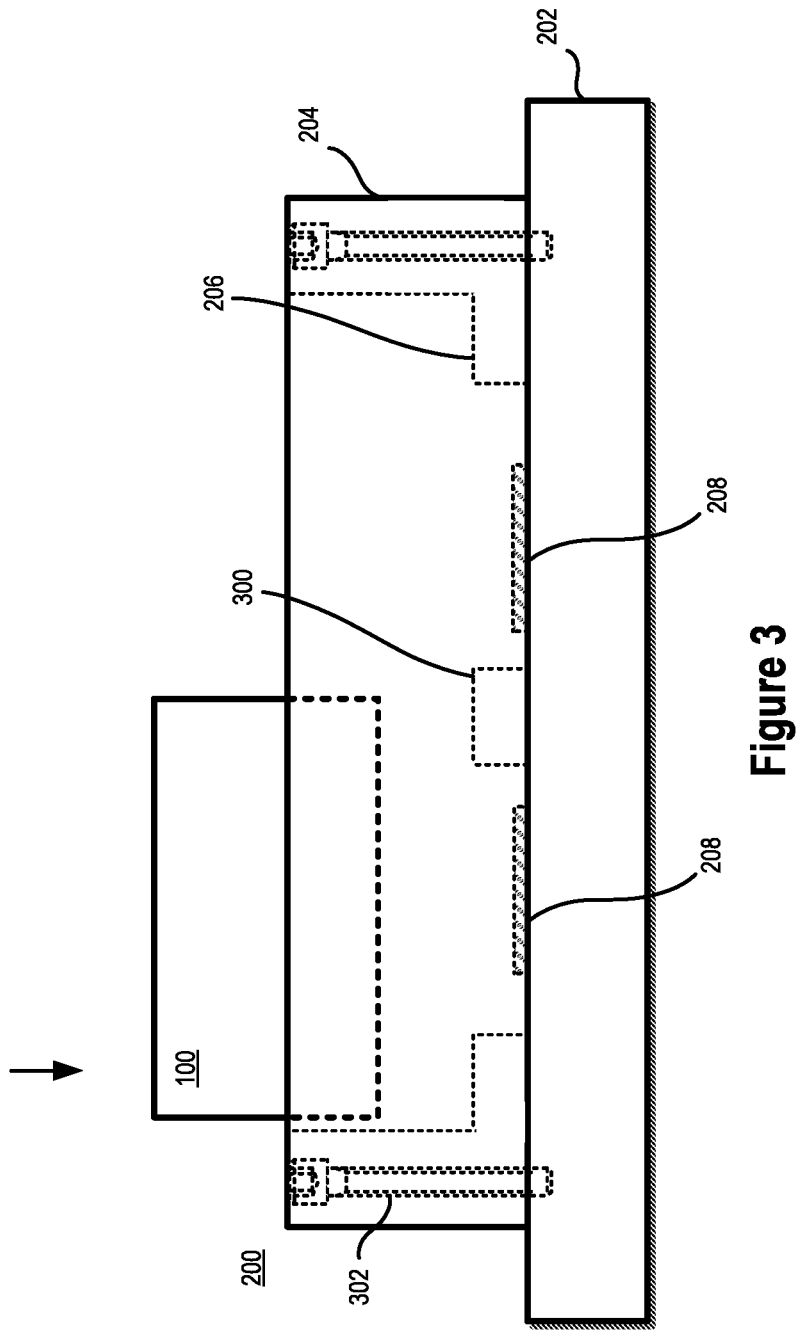
FIG. 3 illustrates a cross-sectional view of a calibration device for an optical non-contact surface roughness measurement device consistent with embodiments disclosed herein.

FIG. 3 illustrates a cross-sectional view of a calibration device 200 for an optical non-contact surface roughness measurement device 100 consistent with embodiments disclosed herein. As illustrated, the calibration device 200 includes a base 202 and an alignment collar 204 disposed on a top side of the base 202. The alignment collar 204 may define a window that exposes the one or more calibration surfaces 208 mounted on the base 202. In some embodiments, the one or more calibration surfaces 208 may be separated by one or more support surfaces 300. In certain embodiments, the one or more support surfaces 300 may be configured to reduce the amount of reflected and/or scattered light leaked from an area of a calibration surface 208 under measurement by the measurement device 100.

As illustrated, the one or more support surfaces 300 may have a top portion at the same vertical height of the vertical alignment ledge 206. In certain embodiments, the optical non-contact surface roughness measurement device 100 may rest on the top portion of the one or more portions 300 in conjunction with the vertical alignment ledge 206 during measurement of the calibration surfaces 208. In this manner, the one or more support surfaces 300 may further function to vertically support the measurement device 100 during use of the calibration device 100.

The alignment collar 204 may include a vertical alignment ledge 206 disposed on an inner periphery of the window defined by the alignment collar 204. In certain embodiments, to calibrate the optical non-contact surface roughness measurement device 100, the measurement device 100 may be lowered into the window defined by the alignment collar 204. As illustrated, a bottom portion of the optical non-contact surface roughness measurement device 100 may be secured against a portion of the vertical alignment ledge 206 within the inner periphery of the alignment collar 204, thereby securing the measurement device 100 at a predefined vertical distance from the one or more calibration surfaces 208. In some embodiments, this predetermined distance may ensure that a substantial portion of any light output by the measurement device 100 that is reflected and/or scattered off the one or more calibration surface 208 is incident upon the one or more arrays of detectors 108 included in the measurement device 100. In this manner, securing a bottom portion of the measurement device 100 against the vertical alignment ledge 206 allows for quick, convenient, and repeatable vertical alignment of the measurement device 100 with respect to the calibration surfaces 208.

The relative elevation of the vertical alignment ledge 206 with respect to the surface of the calibration surfaces 208 may be adjusted using an adjustable mechanism 302 coupling the alignment collar 204 and the base 202. For example, in the illustrated adjustable mechanism 302, the adjustable mechanism 302 includes adjustable screws. By adjusting the screws, the distance between the base 202 and the alignment collar 204, and thus the relative elevation of the vertical alignment ledge 206 with respect to the calibration surfaces 208, may be changed (e.g., the vertical alignment ledge 206 may be "raised" and/or "lowered" with respect to the calibration surfaces 208).

Figure 4:
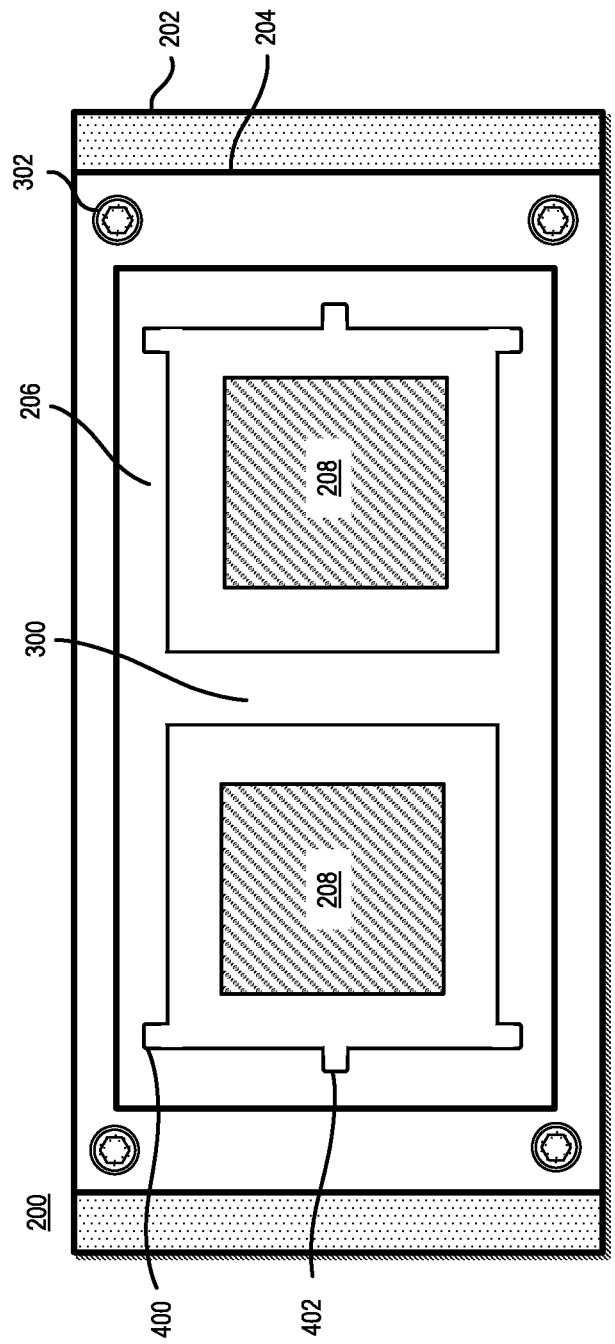
FIG. 4 illustrates a top perspective view of a calibration device for an optical non-contact surface roughness measurement device consistent with embodiments disclosed herein.

FIG. 4 illustrates a top perspective view of a calibration device 200 for an optical non-contact surface roughness measurement device 100 consistent with embodiments disclosed herein. As illustrated, the calibration device 200 includes a base 202 and an alignment collar 204 disposed on a top side of the base 202. The alignment collar 204 may define a window that exposes the one or more calibration surfaces 208 mounted on the base 202. The alignment collar 204 may include a vertical alignment ledge 206 disposed on an inner periphery of the window defined by the alignment collar 204.

To calibrate the optical non-contact surface roughness measurement device 100, the optical measurement device 100 may be lowered into the window defined by the alignment collar 204. As discussed above in reference to FIGS. 2-3, a bottom portion of the optical non-contact surface roughness measurement device 100 may be secured against a portion of the vertical alignment ledge 206 within the inner periphery of the alignment collar 204, thereby securing the measurement device 100 at a predefined vertical distance from the one or more calibration surfaces 208.

The alignment collar 204 and/or vertical alignment ledge 204 may be further used in aligning the measurement device 100 horizontally with respect to the one or more calibration surfaces 208. In some embodiments, a portion of one or more sides of the optical non-contact surface roughness measurement device 100 may be secured against one or more sides of the window defined by the alignment collar 204, thereby orienting the measurement device 100 in a particular horizontal position with respect to the one or more calibration surfaces 208. For example, the measurement device 100 may be secured against the sides in the top left corner (i.e., a corral corner) of the window defined by the alignment collar 204, thereby aligning the measurement device 100 horizontally in a particular position with respect to the one or more calibration surfaces 208. The measurement device 100 may then be slid into another corner of the window (e.g., the top right corner) along the alignment ledge, thereby aligning the measurement device horizontally in a different position with respect to the one or more calibration surfaces 208. By securing the measurement device 100 in a particular horizontal alignment with respect to the one or more calibration surfaces 208 (e.g., a corner of the alignment window), a particular area (e.g., a center, a top left corner, etc.) of the one or more calibration surfaces 208 may be quickly and repeatedly measured by the measurement device 100. Moreover, securing the measurement device 100 in the above manner allows for quick, repeatable, and accurate horizontal and vertical of the measurement device 100 with respect to specific measurement locations on the one or more calibration surfaces 208.

One or more channels 400 may be integrated in the alignment collar 204 during the fabrication process (e.g., during machining) to ensure that corners of the window defined by the alignment collar 204 are properly formed. In certain embodiments, the alignment collar 204 may further include one or more channel windows 402 that allow measurement light output from the measurement device 100 or reflected off the calibration surfaces 208 to pass through without being obstructed by the alignment collar 204. For example, channel windows 402 integrated into the terminal ends of the alignment collar 204 of the calibration device 200 may allow light from the measurement device 100 to pass through on a path to and/or from the calibration surfaces 208.

Figure 5:
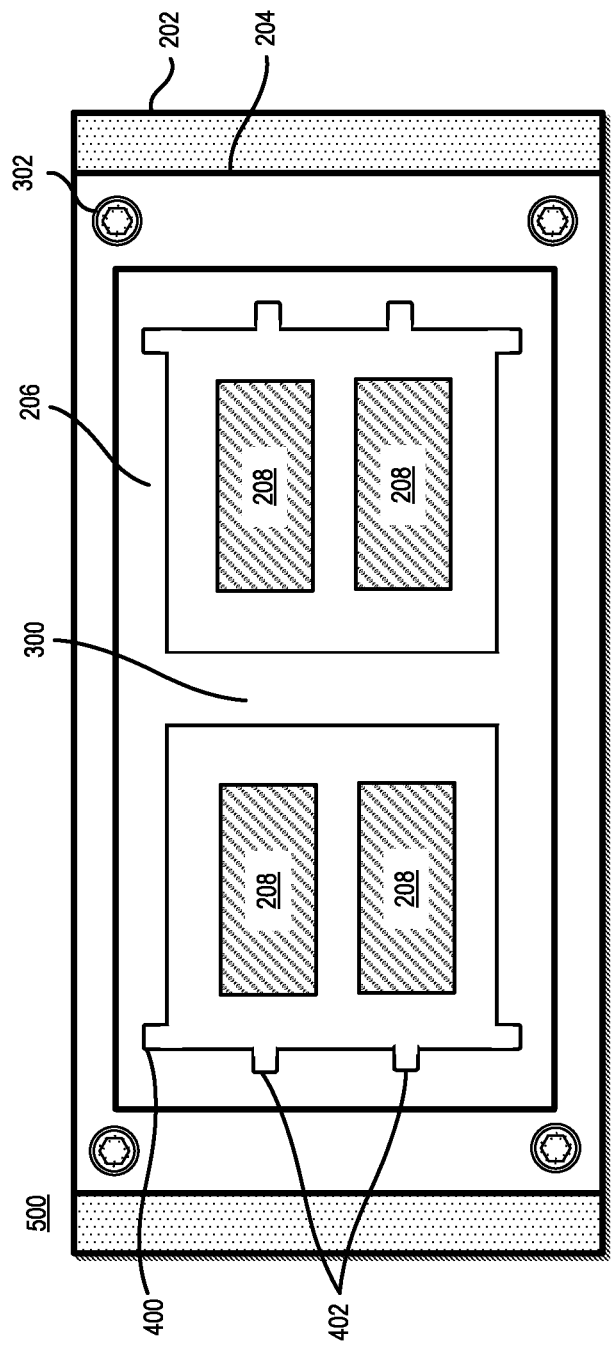
FIG. 5 illustrates another top perspective view of a calibration device for an optical non-contact surface roughness measurement device consistent with embodiments disclosed herein.

FIG. 5 illustrates another top perspective view of calibration device 500 for an optical non-contact surface roughness measurement device 100 consistent with embodiments disclosed herein. Particularly, the illustrated calibration device 500 is similar to the device illustrated in FIG. 4, but includes four calibration surfaces 208. In certain embodiments, the calibration surfaces 208 may have different known surface roughness factors. Accordingly, the calibration device 500 may be used in taking multiple calibration measurements by an optical non-contact surface roughness measurement device 100.

In certain embodiments, the measurement device 100 may be aligned vertically by placing a bottom portion of the measurement device 100 on one or more portions of the vertical alignment ledge 206 and/or the one or more support surfaces 300, as described in detail above. For horizontal alignment, the sides of the measurement device 100 may be secured against one or more sides of the window defined by the alignment collar 204 (e.g., in a corner), thereby securing the measurement device in a particular horizontal position with respect to the calibration surfaces 208. For example, in certain embodiments, the measurement device 100 may be secured against the sides in the top left corner (i.e., the top-left corral corner) of the window defined by the alignment collar 204, thereby aligning the measurement device 100 horizontally in a position for measuring a specific location on the calibration surface 208 located in the top left of the window. Similarly, the measurement device 100 may be secured against the sides in the bottom right corner (i.e., the bottom-right corral corner) of the window defined by the alignment collar 204, thereby aligning the measurement device 100 horizontally in a position for measuring a specific location on the calibration surface 208 located in the bottom right left of the window. By securing the measurement device 100 on the vertical alignment ledge 206 in the corners of the window defined by the alignment collar 204, the same specific locations on the calibration surfaces 208 may be measured in a quick, repeatable, and accurate way. In this manner, quick, repeatable, and accurate verification and calibration the of the measurement device 100 may be achieved.

Figure 6:
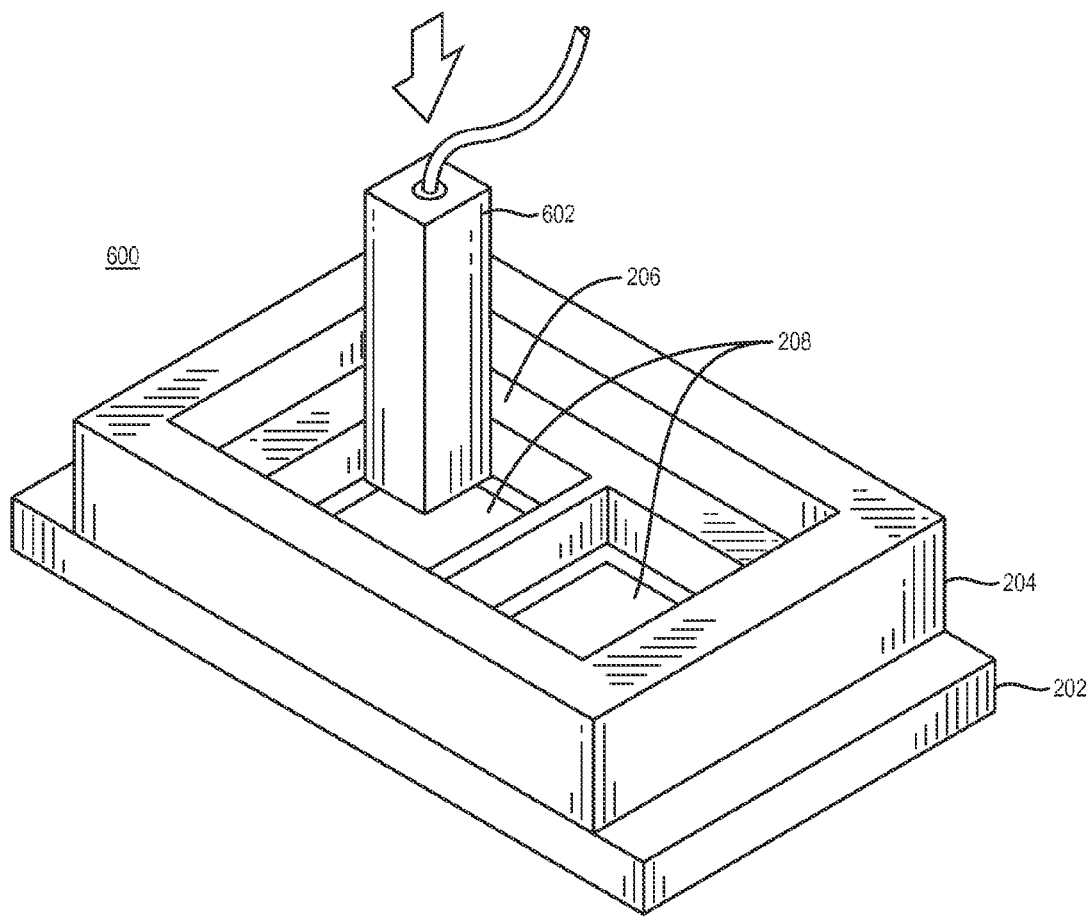
FIG. 6 illustrates a perspective view of a calibration device in use with a miniature optical non-contact surface roughness measurement device consistent with embodiments disclosed herein.

FIG. 6 illustrates a perspective view 600 of a calibration device in use with a miniature optical non-contact surface roughness measurement device 602 consistent with embodiments disclosed herein. In certain embodiments, the optical non-contact surface roughness measurement device 100 described in reference to FIG. 1 may be embodied in a more compact form, as shown in the illustrated miniature optical non-contact surface roughness measurement device 602.

The miniature optical non-contact surface roughness measurement device 602 may utilize the calibration device for calibration measurements in a similar manner to the standard-sized optical non-contact surface roughness measurement device 100. In lieu of using the vertical alignment ledge 206 for vertical alignment, however, vertical alignment of the miniature measurement device 602 may be achieved by placing a bottom portion of the measurement device 602 on the base 202. In such embodiments, the vertical elevation in which calibration surfaces are mounted to the base 202 and/or the mechanical design of the miniature optical non-contact surface roughness measurement device 602 may position the measurement components of the device 602 at a predefined vertical distance from the calibration surfaces 208. In other embodiments, the miniature optical non-contact surface roughness measurement device 602 may utilize one or more portions of the vertical alignment ledge 206 for vertical alignment.

Horizontal alignment of the miniature optical non-contact surface roughness measurement device 602 may be achieved by securing one or more sides of the miniature measurement device 100 against one or more sides of the window defined by the alignment collar 204 in a particular horizontal position with respect to the calibration surfaces 208. For example, as illustrated, the miniature measurement device 602 may be secured against the sides in the top left corner (i.e., the top-left corral corner) of the window defined by the alignment collar 204, thereby aligning the miniature measurement device 602 horizontally in a position for measuring a top-left area of the calibration surfaces 208. Horizontal alignment of the miniature measurement device 602 with respect to other areas of the calibration surfaces 208 may be achieved in a similar manner.

Many changes may be made to the details of the above-described embodiments without departing from the underlying principles of this disclosure. The scope of this disclosure should, therefore, be determined only by the following claims.

What is claimed is:

1. A calibration apparatus for an optical non-contact surface roughness measurement device comprising:
   a base;
   one or more calibration surfaces coupled to a top surface of the base; and
   an alignment collar coupled to the top surface of the base, the alignment collar circumscribing the one or more calibration surfaces and defining a window lying in a plane parallel to the top surface of the base, the window exposing the one or more calibration surfaces,
   wherein the alignment collar further comprises a vertical alignment ledge disposed on an inner periphery of the alignment collar, and wherein the vertical alignment ledge acts as a mechanical stop restricting vertical movement of the optical non-contact surface roughness measurement device.

2. The calibration apparatus of claim 1, wherein the vertical alignment ledge is at a predetermined distance from the one or more calibration surfaces, the predetermined distance relating to a distance required for the optical non-contact surface roughness measurement device to accurately measure the one or more calibration surfaces.

3. The calibration apparatus of claim 1, wherein the vertical alignment ledge is configured to secure the optical non-contact surface roughness measurement device at a predetermined distance from the one or more calibration surfaces.

4. The calibration apparatus of claim 1, wherein the alignment collar is coupled to the top surface of the base with an adjustable mechanism configured to adjust the relative vertical distance between the alignment collar and the top surface of the base.

5. The calibration apparatus of claim 4, wherein the adjustable mechanism comprises one or more adjustable screws configured to adjust the relative distance between the alignment collar the top surface of the base.

6. The calibration apparatus of claim 1, wherein the one or more calibration surfaces are precision ground surfaces.

7. The calibration apparatus of claim 1, wherein the one or more calibration surfaces are precision etched surfaces.

8. The calibration apparatus of claim 1, wherein the one or more calibration surfaces are precision milled surfaces.

9. The calibration apparatus of claim 1, wherein the one or more calibration surfaces have one or more known surface roughness factors.

10. The calibration apparatus of claim 9, wherein the one or more calibration surfaces have one or more surface roughness factors ranging from 0.0025 µm Ra to 3.2 µm Ra.

11. The calibration apparatus of claim 1, wherein the calibration apparatus further comprises:
one or more support surfaces coupled to the top surface of the base, the one or more support surfaces being configured to separate the one or more calibration surfaces.

12. The calibration apparatus of claim 1, wherein the alignment collar comprises one or more channels integrated into an inner periphery of the alignment collar.

13. The calibration apparatus of claim 12, wherein the one or more channels act as mechanical stops restricting horizontal movement of the optical non-contact surface roughness measurement device and secure the optical non-contact surface roughness measurement device in a predetermined horizontal alignment with respect to the one or more calibration surfaces.

14. The calibration apparatus of claim 1, wherein the sides of the window defined by the alignment collar are configured to secure the optical non-contact surface roughness measurement device in a predetermined horizontal alignment with respect to the one or more calibration surfaces.

15. The calibration apparatus of claim 1, wherein the one or more calibration surfaces include a single calibration surface coupled to the top surface of the base in the center of the window defined by the alignment collar.

16. The calibration apparatus of claim 1, wherein the one or more calibration surfaces include a plurality of calibration surfaces coupled to the top surface of the base in a linear configuration within the window defined by the alignment collar.

17. The calibration apparatus of claim 1, wherein the one or more calibration surfaces include a plurality of calibration surfaces coupled to the top surface of the base in a grid configuration within the window defined by the alignment collar.

18. A calibration apparatus for an optical non-contact surface roughness measurement device comprising:
a base;
one or more calibration surfaces coupled to a top surface of the base; and
an alignment collar coupled to the top surface of the base via an adjustable mechanism, the alignment collar comprising a vertical alignment ledge disposed on an inner periphery of the alignment collar, the alignment collar circumscribing the one or more calibration surfaces and defining a window lying in a plane parallel to the top surface of the base, the window exposing the one or more calibration surfaces,
wherein the vertical alignment ledge acts as a mechanical stop restricting vertical movement of the optical non-contact surface roughness measurement device, and
wherein the adjustable mechanism is configured to adjust the relative vertical distance between the vertical alignment ledge and the one or more calibration surfaces to a predetermined distance required for the optical non-contact surface roughness measurement device to accurately measure the one or more calibration surfaces.

19. A calibration apparatus for an optical non-contact surface roughness measurement device comprising:
a base;
one or more calibration surfaces coupled to a top surface of the base; and
an alignment collar coupled to the top surface of the base, the alignment collar circumscribing the one or more calibration surfaces and defining a window lying in a plane parallel to the top surface of the base, the window exposing the one or more calibration surfaces,
wherein the alignment collar comprises one or more channels integrated into an inner periphery of the alignment collar, and
wherein the one or more channels act as mechanical stops restricting horizontal movement of the optical non-contact surface roughness measurement device and secure the optical non-contact surface roughness measurement device in a predetermined horizontal alignment with respect to the one or more calibration surfaces.

* * * * *